July 5, 1955 E. E. KUHARY ET AL 2,712,358
HITCH FOR MOUNTED POWER TAKE-OFF DRIVEN IMPLEMENTS
Filed Sept. 18, 1952 2 Sheets-Sheet 1

INVENTORS
EMERY E. KUHARY
FREDERICK D. SAWYER
BY
W. A. Schaich
H. P. Settle, Jr.
ATTORNEYS

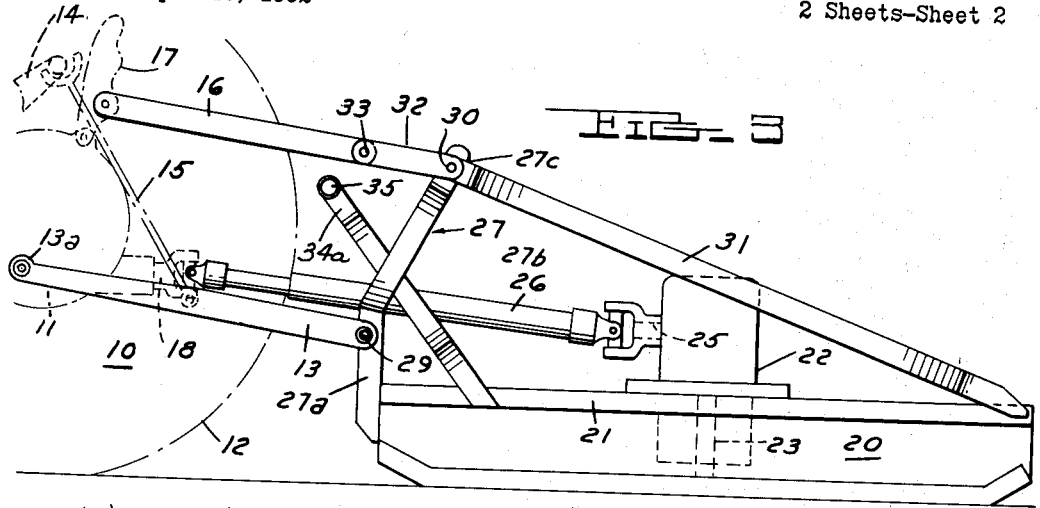
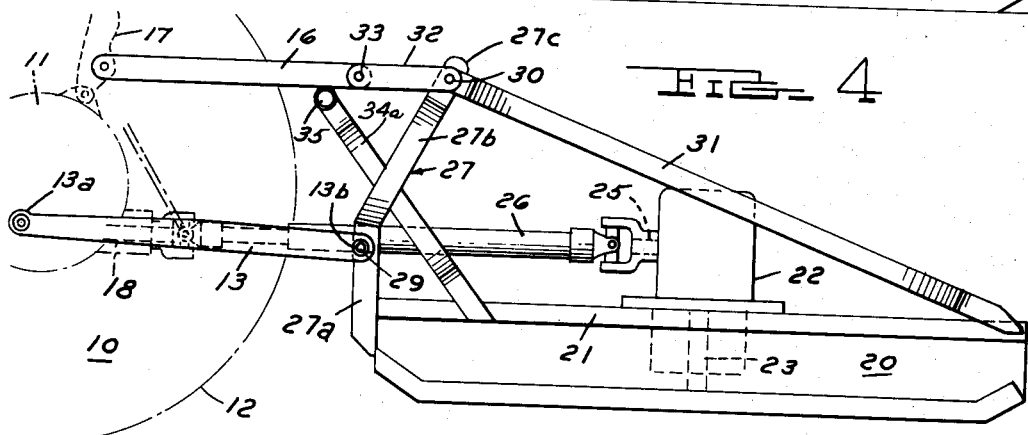
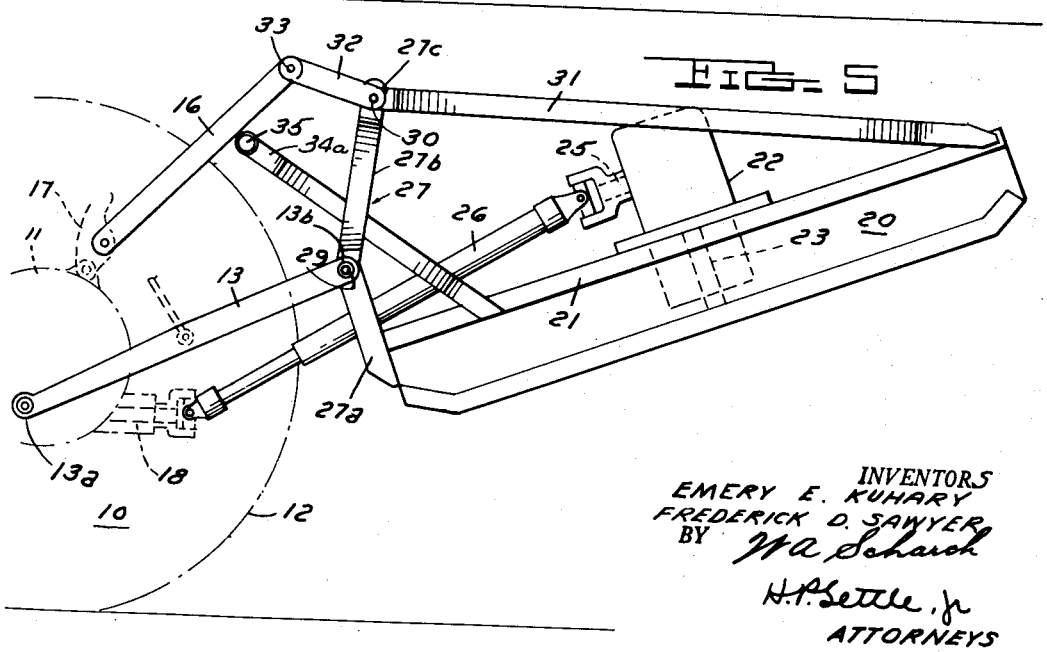

United States Patent Office 2,712,358
Patented July 5, 1955

2,712,358
HITCH FOR MOUNTED POWER TAKE-OFF DRIVEN IMPLEMENTS

Emery E. Kuhary, Royal Oak, and Frederick D. Sawyer, Birmingham, Mich., assignors, by mesne assignments, to Ford Motor Company, Dearborn, Mich., a corporation of Delaware Application September 18, 1952, Serial No. 310,268

3 Claims. (Cl. 180—53)

This invention relates to an improved implement hitching connection, and is particularly useful for connecting lift-type implements having a power-take-off driven working element to tractors of the type having three laterally and vertically spaced, power lifted, pivoted, trailing hitch links and a power-take-off shaft disposed intermediate such hitch links.

There is a well recognized trend in farm machinery design favoring the mounting of all types of implements upon power lifted trailing hitch links on the tractor. The most common form of such tractor hitch link arrangements comprises a pair of laterally spaced, power lifted hitch links pivoted in trailing relationship to the tractor rear axle housing and a centrally disposed, vertically spaced top link pivotally connected to the top of the tractor differential housing. Additionally, it has been common to dispose the power-take-off shaft of the tractor in the lower central portions of the differential housing and hence the power-take-off shaft lies within the space defined by the three hitch links.

There is a certain class of implements, such as mowers and stalk cutters, which have a power-driven working element which is driven from the power-take-off shaft of the tractor by the conventional universally jointed extensible shaft connection. Since the working elements of this type of implement are generally disposed near the center of a frame structure of substantial horizontal extent, a serious design problem is presented when such implements are to be connected to the power lifted hitch links of the tractor for raising and lowering movements. In the first place, it is desirable that the working height of the implement with respect to the ground be controlled by the vertical position of the power-lifted hitch links and this would indicate a requirement for a parallel type of raising and lowering movement of the implement. At the same time, the tractor-implement connection must permit the elevation of the implement to a substantial level above its working position for transport purposes, and in such transport position, the conventional parallel movement type tractor-implement connections result in an interference between the extensible shaft and the main frame of the implement.

Accordingly, it is an object of this invention to provide an improved tractor-implement hitching connection particularly adaptable for connecting implements having a power-take-off driven working element to the power lifted hitch links of a tractor.

A particular object of this invention is to provide a hitching connection for an implement such as a rotary stalk cutter which will permit the working element of the stalk cutter to be driven by the power-take-off shaft of the tractor and which will provide for parallel lifting of the implement through a limited range of working heights with respect to the ground and which will further permit substantial additional elevation of the implement to a transport position without producing interference with the power-take-off driving connection.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 3 is a side elevational view of Figure 1 showing the implement in its lowermost working position with respect to the ground;

Figure 4 is a view similar to Figure 3 but showing the implement in its uppermost working position with respect to the ground; and Figure 5 is a view similar to Figure 3 but showing the implement raised to a transport position.

As shown on the drawings:

Figure 1:
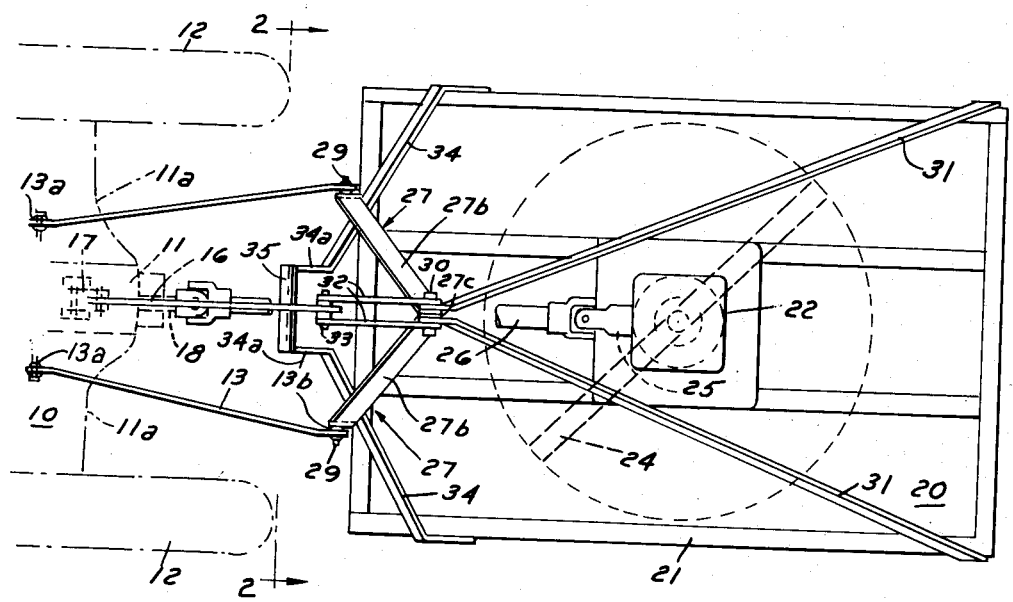
Figure 1 is a top elevational view of a stalk cutter connected to a well-known form of tractor by means of a tractor-implement connection embodying this invention.

Numeral 10 represents a well-known type of tractor having a differential housing 11 and two rear axle housings 11a supported by a pair of rear wheels 12. A pair of hitch links or draw bars 13 are conventionally pivoted to laterally spaced points on the rear axle housing 11a as at 13a and are power-lifted by a rock arm 14 (Figure 3) and a lift link 15. Additionally, a top link 16 is provided which is conventionally pivotally connected to a rocker 17, conventionally mounted on the top central portion of the differential housing 11. A power-take-off shaft 18 is provided on the tractor which is disposed within the confines of the hitch links 13 and top link 16.

Figure 2:
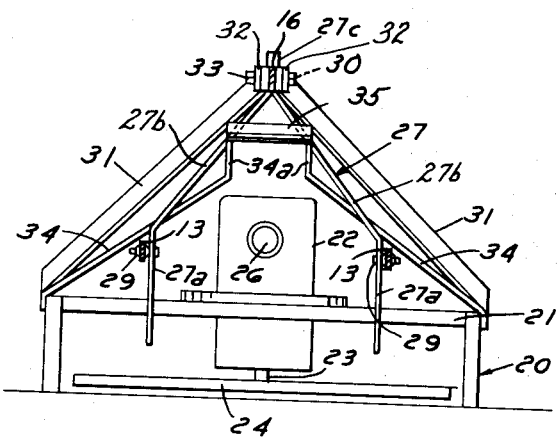
Figure 2 is a sectional view taken on the plane 2—2 of Figure 1.

For purpose of illustration, the implement 20, to which this invention is applied, is shown as constituting a rotary stalk cutter or mower. Such implement has a rigid frame structure 21 of substantial horizontal extent and centrally mounted on such frame structure is a gear box 22. A vertical drive shaft 23 projects downwardly out of the gear box 22 and mounts a rotary cutting blade 24 (Figures 1 and 2) in conventional fashion. Gear box 22 has a horizontally disposed power input shaft 25 and a driving connection is effected between the tractor power-take-off shaft 18 and the power input shaft 25 by means of a conventional universally jointed extensible shaft 26. Along the forward edge of the main frame 21, a pair of upstanding arms 27 are provided having parallel vertical bottom portions 27a and sloped portions 27b which terminate in abutting vertical top portions 27c. A pair of connector pins 29 are respectively mounted on the lower vertical portions 27a of the arms 27 and suitable aligned apertures are provided in the top vertical portions 27 to receive a connecting pin 30. The connector pins 29 are receivable in the hollow connectors 13b conventionally provided in the ends of the hitch links 13.

The top ends of arms 27 are stiffened by brace elements 31 which respectively extend therefrom to the rear corners of the main frame 21. Hence arms 27 and braces 31 define a rigid upstanding subframe. A pair of laterally spaced parallel connecting links 32 are provided having their rear ends pivotally connected to the pin 30 and their forward ends pivotally connected to the trailing end of top link 16, as by a pin 33. The over-all length of connector links 32 and top link 16 is selected so as to be substantially equal to the length of hitch links 13. As a result, the implement 20 would be moved vertically with respect to the ground by parallel motion linkage and hence, as illustrated in Figure 4, it is possible to control the working height of the implement by the power-lifted hitch links of the tractor and maintain the implement in the same position with respect to the ground in all positions in its working range.

However, such parallel lifting arrangement would seriously limit the maximum height at which the implement could be raised relative to the ground, for a slight additional vertical movement of the implement 20 from its position shown in Figure 4 would produce interference between the extensible shaft 26 and the main frame 21 of the implement. Accordingly, this invention additionally provides a pair of support arms 34 which are rigidly secured to the sides of the main frame 21 and project forwardly and upwardly therefrom, terminating in a pair of parallel end portions 34a which underlie the top link 16. Between such end portions 34a, a tubular stop 35 is mounted and such stop will engage the top link 16 upon raising of the implement beyond the position shown in Figure 4. Such engagement of the stop 35 results in an angular displacement of the top link 16 with respect to the connecting links 32 and hence shortens the effective over-all length of the top link 16 and connecting links 32. This has the effect of tilting the front end of the implement 20 downwardly while at the same time raising the rear end so that the implement can be raised to the transport position illustrated in Figure 5. In such transport position, there is no interference between the extensible shaft 26 and the main frame 21 and, furthermore, the additional elevation of the rear end of the implement 20 is very helpful in avoiding contact with the ground whenever the tractor is traversing gulleys or similar uneven terrain. It will also be noted that the tubular stop 35 is of sufficient lateral extent to accommodate the lateral swinging movements of the implement 20 with respect to the tractor that is conventionally permitted by the universally pivoted mounting of the hitch links 13 and 16.

From the foregoing description, it will be apparent that this invention provides an unusually simplified yet extremely effective tractor-implement connection for effecting connection of a power-take-off driven implement to the power-lifted hitch linkage of a tractor.

It will, of course, be understood that various details of construction may be varied through a wide range without departing from the principles of this invention and it is, therefore, not the purpose to limit the patent granted hereon otherwise than necessitated by the scope of the appended claims.

We claim:

1. For use with a tractor having two laterally spaced power-lifted trailing hitch links, a vertically spaced top link and a power-take-off shaft lying intermediate said links, an implement having a horizontally extending rigid frame, an upstanding subframe on said rigid frame, pivot connection means on the top portion of said subframe, laterally spaced connector pins on said implement adapted respectively for pivotal connection to said hitch links, a rotatable working element journaled on the central portions of said rigid frame, a power input shaft having an end operably connected to said working element, extensible shaft means for connecting the other end of said power input shaft to said power-take-off shaft, said extensible shaft means lying intermediate said frame and said pivot connection means, a link pivotally interconnecting said pivot connection means and the trailing end of said top link, the combined length of said last named link and said top link being substantially equal to the length of said hitch links, whereby said implement is initially raised and lowered relative to the tractor by substantially parallel movement, and a rigid stop member on said frame projecting forwardly and upwardly and engageable with said top link after a predetermined raising movement of said implement, thereby producing angular displacement of said link and said top link upon further raising of said implement to tilt the rear of said implement frame upwardly and provide increased clearance for said extensible shaft means.

2. For use with a tractor having two laterally spaced, power-lifted pivotally trailing hitch links, a vertically spaced, pivotally trailing, top link, and a power-take-off shaft lying intermediate said links, an implement having a horizontally extending rigid frame, an upstanding subframe on said rigid frame, pivot connection means on the top portion of said subframe, laterally spaced connector pins on said implement respectively adapted for pivotal connection to said hitch links, a rotatable working element journaled on the central portions of said rigid frame, a power input shaft having an end operably connected to said working element, extensible shaft means lying intermediate said frame and said pivot connection means and pivotally connecting said power input shaft and said power-take-off shaft, a link pivotally interconnecting said pivot connection means and the trailing end of said top link, the combined length of said last named link and said top link being substantially equal to the length of said hitch links, whereby said implement is initially raised and lowered relative to the tractor by substantially parallel movement, a pair of laterally spaced supports mounted on said frame and projecting upwardly and forwardly to underlie said top link, a horizontally disposed tube mounted between said supports and disposed to engage said top link after a predetermined raising movement of said hitch links, thereby producing angular displacement of said link and said top link upon further raising of said implement to tilt the rear of said implement frame upwardly and provide increased clearance for said extensible shaft means.

3. For use with a tractor having two laterally spaced power-lifted pivotally trailing draw bars and a vertically spaced pivotally trailing top link, an implement having a horizontally extending rigid frame including an upstanding sub-frame, laterally spaced connector pins on said implement adapted for pivotal connection respectively to said laterally spaced draw bars, pivot connection means on the top portion of said subframe, a link pivotally inter-connecting said pivot connection means and the trailing end of said top link, the combined length of said last named link and said top link being substantially equal to the length of said draw bars, whereby said implement is initially raised and lowered relative to the tractor by substantially parallel movement, and a rigid stop member on said frame projecting forwardly and upwardly and engageable with one of said links after a predetermined raising movement of said implement, thereby producing angular displacement of said link and said top link upon further raising of said implement to tilt the rear of said implement frame upwardly.

References Cited in the file of this patent

UNITED STATES PATENTS

| 2,223,002 | Ferguson | Nov. 26, 1940 |
| 2,462,588 | Wondra | Feb. 22, 1949 |
| 2,517,163 | Arps | Aug. 1, 1950 |
| 2,618,350 | Von Ruden | Nov. 18, 1952 |
| 2,631,514 | Roeder | Mar. 17, 1953 |